(12) United States Patent
Park (10) Patent No.: US 10,352,958 B2
(45) Date of Patent: Jul. 16, 2019

(54) ELECTRONIC DEVICE AND DRIVER DETERMINING METHOD THEREOF

(71) Applicant: HYUNDAI MOTOR COMPANY, Seoul (KR)

(72) Inventor: Un Kyu Park, Seoul (KR)

(73) Assignee: Hyundai Motor Company, Seoul (KR)

( * ) Notice: Subject to any disclaimer, the term of this patent is extended or adjusted under 35 U.S.C. 154(b) by 320 days.

(21) Appl. No.: 14/959,534

(22) Filed: Dec. 4, 2015

(65) Prior Publication Data

US 2016/0327407 A1 Nov. 10, 2016

(30) Foreign Application Priority Data

May 7, 2015 (KR) .................. 10-2015-0063928

(51) Int. Cl.
*G01P 15/00* (2006.01)
*B60K 28/02* (2006.01)

(52) U.S. Cl.
CPC .............. *G01P 15/00* (2013.01); *B60K 28/02* (2013.01); *B60W 2540/18* (2013.01)

(58) Field of Classification Search
CPC ........................................................ G01P 15/00
USPC ......................................................... 702/151
See application file for complete search history.

(56) References Cited

U.S. PATENT DOCUMENTS

| 4,747,055 A | 5/1988 | Eto et al. | |
| 5,574,641 A * | 11/1996 | Kawakami | A61B 5/18 180/272 |
| 7,109,862 B2 * | 9/2006 | Braeuchle | B62D 1/06 340/561 |
| 9,037,125 B1 * | 5/2015 | Kadous | H04M 1/72577 455/418 |
| 2010/0228417 A1 * | 9/2010 | Lee | B62D 15/025 701/23 |
| 2014/0273849 A1 | 9/2014 | Lee et al. | |
| 2016/0046323 A1 * | 2/2016 | Klank | B62D 15/021 701/41 |
| 2017/0150255 A1 * | 5/2017 | Wang | H04R 3/005 |

FOREIGN PATENT DOCUMENTS

| JP | 2015-003530 | 1/2015 | |
| KR | 10-1995-0015023 | 12/1995 | |
| KR | 10-2005-0026192 A | 3/2005 | |
| KR | 10-2014-0105309 A | 9/2014 | |
| KR | 10-2014-0113118 A | 9/2014 | |
| KR | 10-2014-0113158 A | 9/2014 | |
| WO | WO 2016189358 A1 * | 12/2016 | ............ B60W 50/08 |

\* cited by examiner

*Primary Examiner* — Ricky Ngon
(74) *Attorney, Agent, or Firm* — Brinks Gilson & Lione (57) ABSTRACT

Disclosed are electronic devices capable of determining whether a possessor of a portable electronic device is a driver or a passenger and to provide necessary different information to each electronic device, and a drive determination method thereof. The electronic device includes: a sensor module for detecting movement of the electronic device; a communication module for receiving a steering angle of a steering wheel from an external electronic device; and a control module for determining whether a user of the electronic device is driving based on the detected movement of the electronic device and the received steering angle of the steering wheel.

14 Claims, 6 Drawing Sheets

ELECTRONIC DEVICE AND DRIVER DETERMINING METHOD THEREOF

CROSS-REFERENCE TO RELATED APPLICATION

This application claims the benefit of priority to Korean Patent Application No. 10-2015-0063928, filed on May 7, 2015 in the Korean Intellectual Property Office, the disclosure of which is incorporated herein in its entirety by reference.

BACKGROUND

Field

The present disclosure relates to an electronic device operating in conjunction with a vehicle.

Description of the Related Art

In recent years, with the development of the electronic technology, various portable electronic devices such as a smart phone, a tablet PC, and a wearable device have been developed. Such a portable electronic device has been widely diffused to most persons for the purpose of use and portability, and may be variously used in an actual life including a playing of various multi-media data, a playing of internet surfing, or the like.

A technology for providing various services by cooperating a portable electronic device with a vehicle has been developed.

When a plurality of persons get on a vehicle, there may be various portable electronic devices belonging to each passenger inside the vehicle. Since a driver and passengers among vehicle occupants require different information, it is desirable to classify portable electronic devices inside the vehicle into a device belonging to the driver and a device belonging to the passenger.

SUMMARY

The present disclosure has been made in view of the above problems, and provides an electronic device capable of determining whether a possessor of a portable electronic device is a driver or a passenger, and to provide necessary different information to each electronic device, and a drive determination method thereof.

In one aspect of the present disclosure, an electronic device includes: a sensor module configured to detect movement of the electronic device; a communication module configured to receive a steering angle of a steering wheel from an external electronic device; and a control module configured to determine whether a user of the electronic device is driving by using the movement of the electronic device and the received steering angle of the steering wheel.

In another aspect of the present disclosure, an electronic device includes: a steering angle sensor configured to measure a steering angle of a steering wheel; a communication module configured to receive movement information of the electronic device from an external electronic device; and a control module configured to determine whether a user of the external electronic device is driving by using the received movement information of the external electronic device and the steering angle of the steering wheel, to control to transmit first information when the user of the external electronic device is driving, and to control to transmit second information when the user of the external electronic device is not driving.

In another aspect of the present disclosure, a driver determination method of an electronic device includes: measuring a steering angle of a steering wheel; receiving movement information of the electronic device from an external electronic device; and determining whether a user of the external electronic device is driving by using the movement information of the external electronic device and the steering angle of the steering wheel.

Various forms of the present disclosure may determine whether a user of an electronic device inside the vehicle is a driver or a passenger, and transmit necessary information to each electronic device.

BRIEF DESCRIPTION OF THE DRAWINGS

The objects, features and advantages of the present disclosure will be more apparent from the following detailed description in conjunction with the accompanying drawings, in which.

DETAILED DESCRIPTION

Hereinafter, various forms of the present disclosure will be described with reference to accompanying drawings. However, the disclosure is not limited to specific forms, but the disclosure includes all modifications, equivalents, and/or substitutes belonging to the technical scope of the disclosure without departing from the spirit of the disclosure. Like or the same elements designated by like or the same numerals are used in drawings.

In the following description, the term "have", "may have", "include", or "may include" will be used to refer to the feature, the number, the step, the operation, the component, the part or the combination thereof without excluding the presence or addition of one or more features, the numbers, the steps, the operations, the components, the parts or the combinations thereof.

In the specification, expressions such as "A or B," "at least one of A or/and B," or "one or more of A or/and B" may include all possible combination of listed items. For example, "A or B," "at least one of A and B," or "at least one A or B" may designate all cases of including (1) at least A, (2) at least B, or (3) both of at least one A and at least one B. Expressions such as "first" and "second" represent various constituent elements regardless of orders and/or importance. One constituent element is used to be distinguished from other constituent elements but does not limit corresponding constituent elements. For example, the first user device and the second user device may represent other user device regardless of order or importance. For instance, the first component may be referred to the second component and vice versa without departing from the right of the disclosure.

It will be understood that when an element (e.g., first element) is referred to as being "connected" or "coupled" to another element (e.g., second element), it can be directly connected or coupled to the other element (e.g., third element) or intervening elements may be present. In contrast, when an element (e.g., first element) is referred to as being "directly connected" or "directly coupled" to another element (e.g., second element), there are no intervening elements present.

The expression used in the specification, "~configured to" may be replaced with "~suitable for," "~having the capacity to," "~designed to," "~adapted to," "~made to," or "~capable of" according to its situation. The term "~configured to" must not be interpreted to include only "specifically designed to" in hardware. Instead, the expression "~device configured to" may mean "~capable of" together with other device or components. For example, a "processor configured to perform A, B, and C" may means a dedicated processor (e.g., embedded processor) for performing a corresponding operation and a generic-purpose processor (e.g., a CPU or an application processor) capable of performing corresponding operations by executing at least one software program stored in a memory device.

The terminology used herein is for the purpose of describing particular example forms only and is not intended to be limiting of the present inventive concept. It should also be noted that in some alternative implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved.

Figure 1:
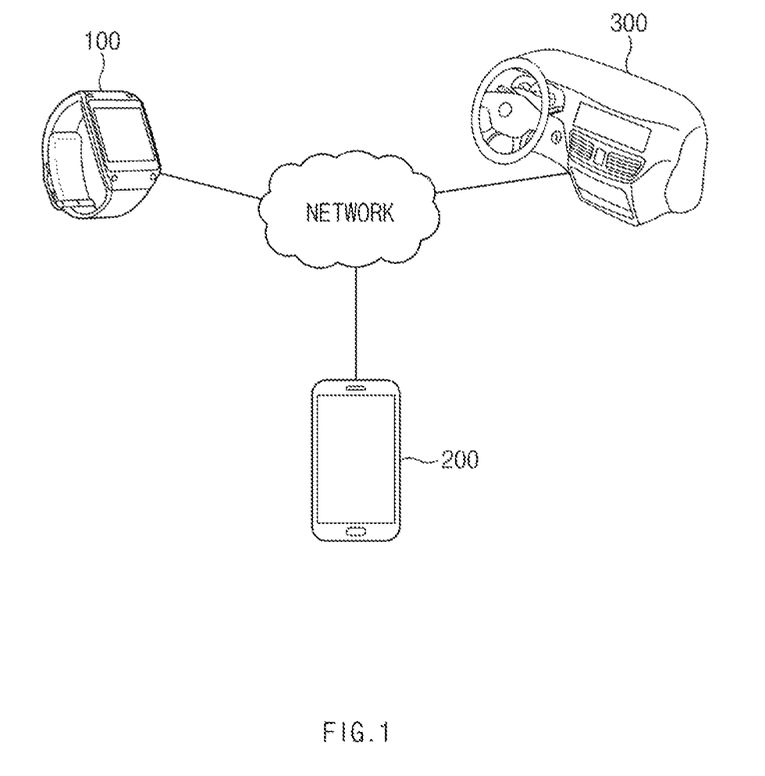
FIG. 1 is a diagram illustrating a vehicle system.

FIG. 1 is a diagram illustrating a vehicle system. A vehicle system may include a first electronic device 100, a second electronic device 200, and a third electronic device 300. The vehicle system according to various forms of the present disclosure may determine whether a user of the first electronic device 100 is driving by the first electronic device 100 or the third electronic device 300, and the third electronic device 300 may provide different contents to the first electronic device 100 according to the determination result.

The first electronic device 100, the second electronic device 200, and the third electronic device 300 may communicate with each other through a network 10. For example, the first electronic device 100, the second electronic device 200, and the third electronic device 300 may be connected to each other through a short-range communication technology such as Bluetooth communication, zigbee communication, near field communication (NFC), and the like.

In some implementations, the first electronic device 100 may determine whether a user of the first electronic device 100 is driving. In some implementations, the first electronic device 100 may determine whether a user is driving by using vehicle running information or a beacon signal received from the third electronic device 300. In some implementations, the first electronic device 100 may transmit a determination result on whether a user is driving to the third electronic device 300.

In some implementations, the first electronic device 100 may transmit movement information of the first electronic device 100 to the third electronic device 300. In some implementations, the first electronic device 100 may generate a beacon signal. For example, the first electronic device 100 may adjust strength of the beacon signal so that the third electronic device 300 may receive the beacon signal only in a specific space in the vehicle.

The first electronic device 100 may directly communicate with the third electronic device 300 or may communicate with the third electronic device 300 through the second electronic device 200.

In some implementations, the first electronic device 100 may include a wearable device. For example, the first electronic device 100 may be implemented by a smart watch, a smart band, a smart ring, and a smart glove which may be worn in a wrist, a finger, and an arm of the user.

In some implementations, the second electronic device 200 may directly communicate with the first electronic device 100 or the third electronic device 300 to transmit information received from the third electronic device 300 to the first electronic device 100 or to transmit information received from the first electronic device 100 to the third electronic device 300. In some implementations, the second electronic device 200 may include a portable electronic device such as a smart phone or a tablet PC.

In some implementations, the third electronic device 300 may collect and transmit vehicle running information to the first electronic device 100. For example, the vehicle running information may include a steering angle of a steering wheel or a speed of the vehicle. The third electronic device 300 may directly communicate with the first electronic device 100 or may communicate with the first electronic device 100 through the second electronic device 200.

In some implementations, the third electronic device 300 may include an electronic device mounted in a vehicle. For example, the third electronic device 300 may include a vehicle controller for detecting a state of the vehicle and controlling the vehicle, and an audio, video, navigation device (AVN).

In some implementations, the third electronic device 300 may generate a beacon signal. In some implementations, the third electronic device 300 may generate the beacon signal to be recognized only at a specific location (e.g., driver's seat) inside the vehicle. For example, the third electronic device 300 may control strength of the beacon signal so that the first electronic device 100 may receive the beacon signal only at the driver's seat or around the steering wheel.

In some implementations, the third electronic device 300 may determine whether the user of the first electronic device 100 is driving. In some implementations, the third electronic device 300 may determine whether the user of the first electronic device 100 is driving by using the movement information or the beacon signal received from the first electronic device 100.

In some implementations, the third electronic device 300 may transmit information on running of the vehicle or various contents to the first electronic device 100 or the second electronic device 200. According to an embodiment, the third electronic device 300 may transmit different information depending on whether the user of the electronic device existing in the vehicle is driving.

Figure 2:
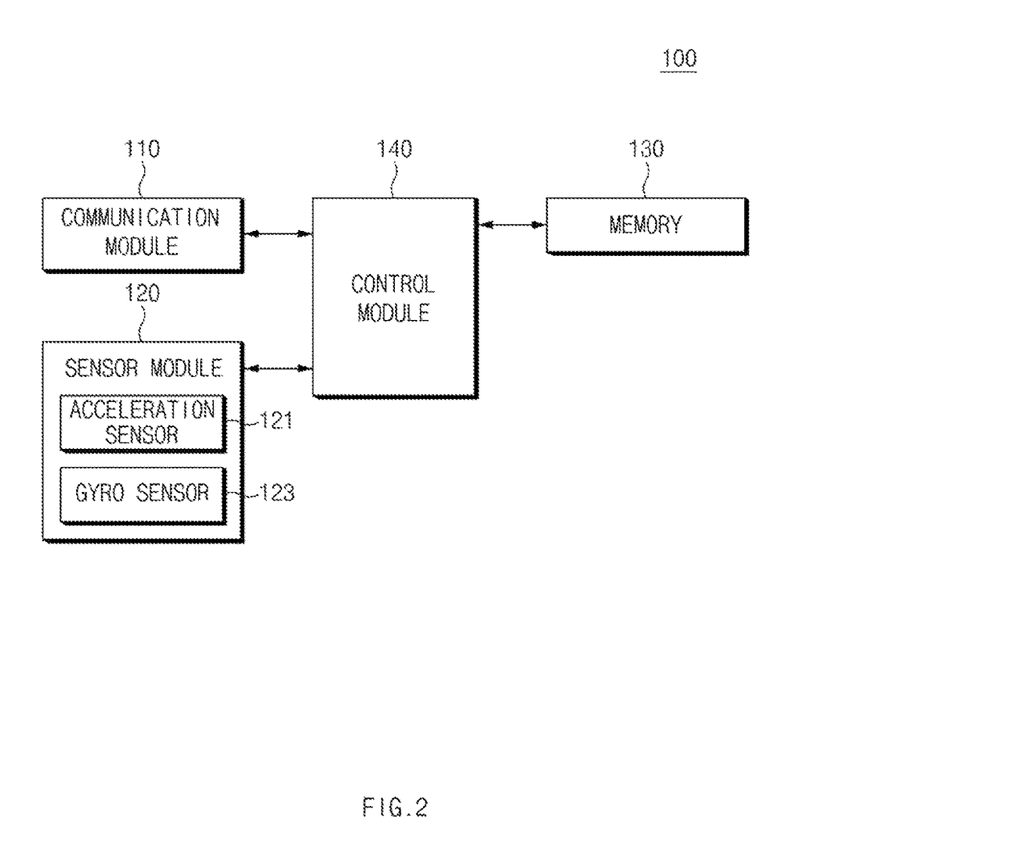
FIG. 2 is a block diagram illustrating a configuration of an electronic device.

FIG. 2 is a block diagram illustrating a configuration of an electronic device. In FIG. 2, the first electronic device 100 may include a communication module 110, a sensor module 120, a memory 130, and a control module 140.

The communication module 110 may communicate with the second electronic device 200 or the third electronic device 300. In some implementations, the communication module 110 may include at least one of a Bluetooth module, a zigbee module, and a near field communication (NFC) module.

In some implementations, the communication module 110 may receive vehicle running information from the second electronic device 200 or the third electronic device 300. The vehicle running information may include, for example, a steering angle of a steering wheel and/or a speed of the vehicle. In some implementations, the communication module 110 may receive radius information of the steering wheel from the second electronic device 200 or the third electronic device 300.

In some implementations, the communication module 110 may receive the beacon signal from the third electronic device 300. For example, the communication module 110 may receive a beacon signal from the third electronic device 300 using the Bluetooth communication or the zigbee communication.

In some implementations, the communication module 110 may transmit movement information of the first electronic device 100 to the third electronic device 300. In some implementations, the communication module 110 may transmit device identification information that can identify a device to the third electronic device 300. In some implementations, the communication module 110 may generate a beacon signal. The beacon signal may include the device identification information that can identify, for example, the first electronic device 100.

The sensor module 120 may detect movement of the first electronic device 100. In some implementations, the sensor module 120 may include an acceleration sensor 121 or a gyro sensor 123. The acceleration sensor 121 may detect acceleration of the first electronic device 100. For example, the acceleration sensor 121 may detect acceleration of the first electronic device 100 and output an acceleration value of the first electronic device 100 in directions of three axes (e.g., x axis, y axis, and z axis). The gyro sensor 123 may detect rotary angular velocity of the first electronic device 100. For example, the gyro sensor 123 may detect an angular velocity of the first electronic device 100 and output the angular velocity of the first electronic device 100 in directions of three axes (e.g., x axis, y axis, and z axis).

The memory 130 may store a length from a center of the steering wheel to the first electronic device 100 in a state in which the user wearing the first electronic device 100 grips the steering wheel of the third electronic device 300. The length from the center of the steering wheel to the first electronic device 100 may include, for example, a radius of the steering wheel and a length formed according to grip of the steering wheel. In some implementations, the radius information of the steering wheel may be received from the third electronic device 300 or may be input from the user to be stored. For example, a radius of the steering wheel may be directly input from the user. For another example, if a type of a running vehicle or a type of a steering wheel is input from the user, a corresponding radius may be calculated. The length formed according to a grip of the steering wheel may be changed according to a wearing position of the first electronic device 100. The memory 130 may store a preset distance from the steering wheel to the first electronic device 100 according to the wearing position of the first electronic device 100.

In some implementations, the control module 140 may control an overall operation of the first electronic device 100. For example, the control module 140 may drive an operating system or an application program to control various hardware or software constituent elements connected to the control module 140, and may perform various data processing and calculation.

In some implementations, the control module 140 may determine whether a user of the first electronic device 100 is driving by using the movement of the first electronic device 100 and the vehicle running information. In some implementations, when the speed of the vehicle is equal to or greater than designated speed (e.g., 10 km/h), the control module 140 may determine whether the user is driving.

Figure 3A:
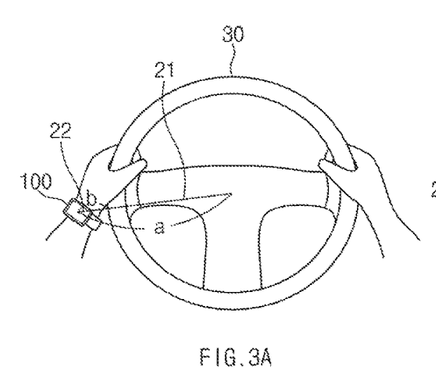
FIG. 3A and FIG. 3B are diagrams illustrating a situation for operating a steering wheel by a user wearing a first electronic device.
Figure 3B:
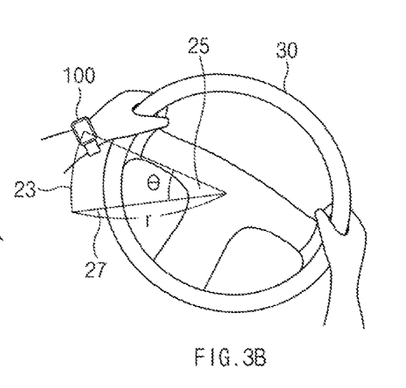

FIG. 3A and FIG. 3B are diagrams illustrating a situation for operating a steering wheel by a user wearing a first electronic device.

FIG. 3A illustrates a state in which the user wears the first electronic device 100 and grips the steering wheel 30 included in the vehicle. FIG. 3B illustrates a state in which the user rotates the steering wheel 30 in a right direction by an angle θ.

In some implementations, the control module 140 may determine a moving direction of the steering wheel by using the steering angle. For example, the control module 140 may determine whether the steering wheel is rotated in a right direction or in a left direction by using the steering angle. In some implementations, the control module 140 may determine whether the direction of the steering wheel is identical with the moving direction of the first electronic device 100. For example, referring to FIG. 3A and FIG. 3B, when the steering wheel is rotated in a right direction, the control module 140 may determine that the direction of the steering wheel is identical with the moving direction of the first electronic device 100 because the first electronic device 100 is rotated in a right direction 23 which is a rotation direction of the steering wheel.

In some implementations, when the direction of the steering wheel is identical with the moving direction of the first electronic device 100 designated times or more within a designated time, the control module 140 may determine that the user is driving.

In some implementations, the control module 140 may determine an angle formed by the movement of the first electronic device 100. For example, when the first electronic device 100 moves to make a curve corresponding to a circle, the control module 140 may determine an angle formed by the movement of the first electronic device 100 based on the circle formed by the moved track of the first electronic device 100. For example, referring to FIG. 3B, the control module 140 may determine the angle formed by the movement of the first electronic device 100 as θ(25).

In some implementations, the control module 140 may determine whether the angle formed by the movement of the first electronic device 100 is identical with a change amount of the steering angle. As shown in FIG. 3A and FIG. 3B, when the user grips the steering wheel to operate the steering wheel, the angle formed by the movement of the first electronic device 100 may be identical with the change amount of the steering angle. In some implementations, when the direction of the steering wheel is identical with the moving direction of the first electronic device 100 designated times or more within a designated time, the control module 140 may determine that the user is driving.

In some implementations, the control module 140 may determine a radius formed by the movement of the first electronic device 100. For example, when the first electronic device 100 moves to make a curve corresponding to a circle, the control module 140 may determine the radius of the circle formed by the movement track of the first electronic device 100. Referring to FIG. 3B, the control module 140 may determine the radius formed by the movement of the first electronic device 100 as r (27). In some implementations, the control module 140 may determine whether the radius formed by the movement of the first electronic device 100 is identical with a length from a center of the steering wheel stored in the memory 130 to the first electronic device 100. For example, referring to FIG. 3A and FIG. 3B, when the user grips the steering wheel to operate the steering wheel, the radius r(25) formed by the movement of the first electronic device 100 may be identical with a length a(21)+b(22) from the center of the steering wheel stored in the memory 130 to the first electronic device 100. In some implementations, when the radius r(25) formed by the movement of the first electronic device 100 is identical with the length a(21)+b(22) from the center of the steering wheel stored in the memory 130 to the first electronic device 100 designated times or more within a designated time, the control module 140 may determine that the user of the first electronic device 100 is driving.

In some implementations, if at least one (e.g., two) of the above determination condition is satisfied, the control module 140 may determine that the user of the first electronic device 100 is driving.

In some implementations, if the above determination conditions are satisfied designated times or more within a designated time, the control module 140 may determine that the user of the first electronic device 100 is driving.

In some implementations, the control module 140 may determine whether the user of the first electronic device 100 is driving by using a beacon signal received from the third electronic device 300. For example, when the designated beacon signal is received from the third electronic device 300, the control module 140 may determine that the user of the first electronic device 100 is driving.

In some implementations, the control module 140 may learn a determination result on whether the user of the first electronic device 100 is driving. For example, the control module 140 may learn a movement pattern of the first electronic device 100 when the user of the first electronic device 100 is driving and a movement pattern of the first electronic device 100 when the user of the first electronic device 100 is not driving by using a learning algorithm. In some implementations, when the steering angle is not received from the third electronic device 300, the control module 140 may determine whether the user is driving by using only the movement of the first electronic device 100 based on the learning result.

In some implementations, the control module 140 may control to transmit a determination result on whether the user of the first electronic device 100 is driving.

Figure 4:
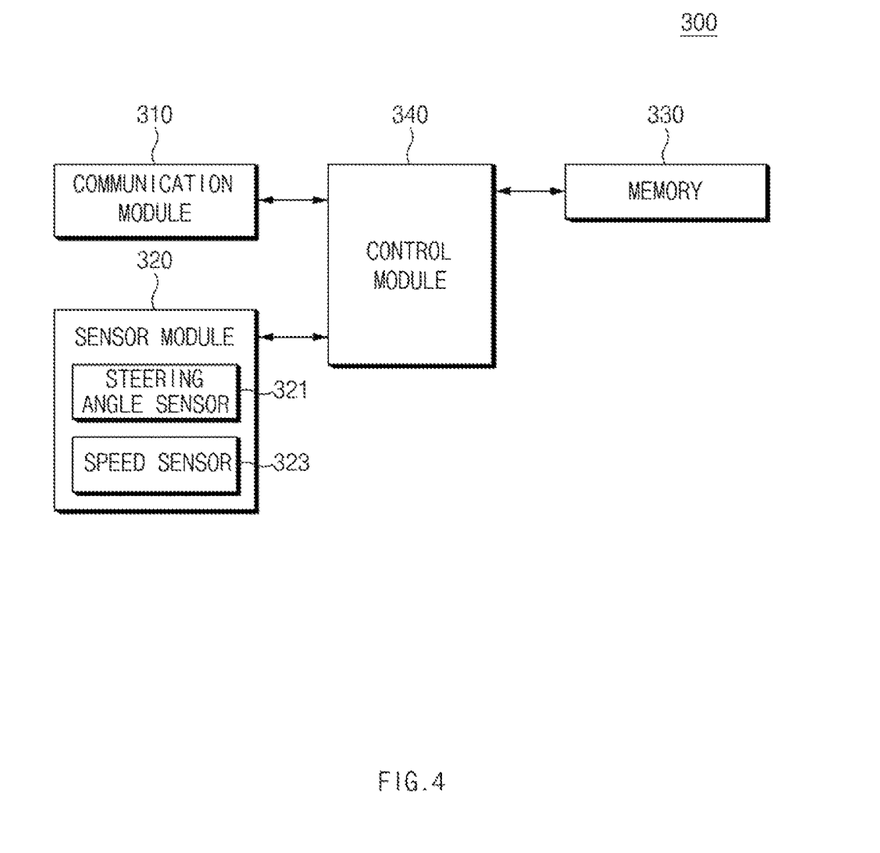
FIG. 4 is a block diagram illustrating a configuration of a vehicle.

FIG. 4 is a block diagram illustrating a configuration of a vehicle. In FIG. 4, the third electronic device 300 may include a communication module 310, a sensor module 320, a memory 330, and a control module 340.

The communication module 310 may communicate with the first electronic device 100 or the second electronic device 200. In some implementations, the communication module 310 may include at least one of a Bluetooth module, a zigbee module, and a near field communication (NFC) module. In some implementations, the communication module 310 may include a global navigation satellite system (GNSS) module.

In some implementations, the communication module 310 may transmit vehicle running information to the first electronic device 100 or the second electronic device 200. The vehicle running information may include, for example, a steering angle of a steering wheel and/or a speed of the vehicle. In some implementations, the communication module 310 may transmit radius information of the steering wheel to the first electronic device 100 or the second electronic device 200. In some implementations, the communication module 310 may receive moving information of the first electronic device 100 from the first electronic device 100 or the second electronic device 200.

In some implementations, the communication module 310 may generate a beacon signal. The beacon signal may include device identification information that can identify, for example, the third electronic device 300.

In some implementations, the communication module 310 may receive the beacon signal from the first electronic device 100. For example, the communication module 310 may receive the beacon signal from the first electronic device 100 by using the Bluetooth communication or the zigbee communication.

In some implementations, the communication module 310 may transmit information or various contents related to the running of the vehicle to the first electronic device 100 or the second electronic device 200.

The sensor module 320 may detect a running state of the vehicle. In some implementations, the sensor module 320 may include a steering angle sensor 321 and a speed sensor 323. The steering angle sensor 321 may detect a steering angle of the steering wheel. The speed sensor 323 may detect speed of the vehicle. For example, the speed sensor 323 may calculate and output the speed of the vehicle according to rotation of a wheel.

The memory 330 may store a length from a center of the steering wheel to the first electronic device 100 in a state in which the user wearing the first electronic device 100 grips the steering wheel of the vehicle. The length from the center of the steering wheel to the first electronic device 100 may include, for example, a radius of the steering wheel and a length formed according to the gripping of the steering wheel. In some implementations, the radius information of the steering wheel may be received from the first electronic device 100 or may be input from the user to be stored.

In some implementations, the control module 340 may determine whether a user of the first electronic device 100 is driving by using the movement of the first electronic device 100 and the vehicle running information. In some implementations, when the speed of the vehicle is equal to or greater than designated speed (e.g., 10 km/h), the control module 340 may determine whether the user is driving. The method of determining whether the user of the first electronic device 100 is driving was described based on the first electronic device 100 with reference to FIG. 2, FIG. 3A and FIG. 3B. The control module 340 of the third electronic device 300 may determine whether a user of the first electronic device 100 is driving in the same manner as the control module 340 of the first electronic device 100.

In some implementations, the control module 340 may learn a determination result on whether the user of the first electronic device 100 is driving. For example, the control module 340 may learn a movement pattern of the first electronic device 100 when the user of the first electronic device 100 is driving and a movement pattern of the first electronic device 100 when the user of the first electronic device 100 is not driving by using a learning algorithm. In some implementations, when the steering angle is not received from the third electronic device 300, the control module 140 may determine whether the user is driving by using only the movement of the first electronic device 100 based on the learning result. In some implementations, the control module 340 may learn the determination result on whether the user of the electronic device is driving for each electronic device.

In some implementations, the control module 340 may control to transmit different information to the first electronic device 100 depending on whether the user of the first electronic device 100 is driving. For example, if the user of the first electronic device 100 is driving, the control module 340 may transmit information on running of the vehicle such as a speed limit, a traffic signal violation alarm signal, traffic information, and a remaining distance to a destination to the first electronic device 100 or the second electronic device 200. For another example, if the user of the first electronic device 100 is not driving (e.g., passenger), the control module 340 may provide contents such as moving images, images, music, and the like to the first electronic device 100 or the second electronic device 200.

Figure 5:
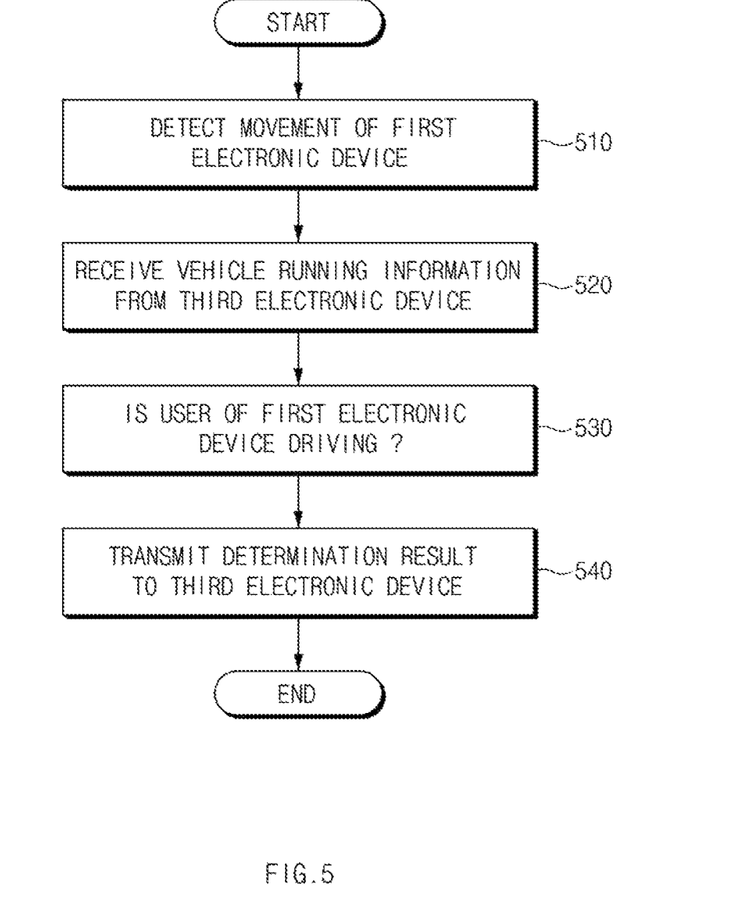
FIG. 5 is a flowchart illustrating a driver determination method of a first electronic device.

FIG. 5 is a flowchart illustrating a driver determination method of a first electronic device. In FIG. 5, at operation 510, the first electronic device 100 may detect movement of the first electronic device 100. In some implementations, the first electronic device 100 may detect movement of the first electronic device 100 by using an acceleration sensor and a gyro sensor.

At operation 520, the first electronic device 100 may receive vehicle running information from the third electronic device 300. The vehicle running information may include, for example, a steering angle of the steering wheel and/or the speed of the vehicle.

In some implementations, at operation 530, the first electronic device 100 may determine whether a user of the first electronic device 100 is driving by using the movement of the first electronic device 100 and the vehicle running information.

In some implementations, the first electronic device 100 may determine a moving direction of the steering wheel by using the steering angle of the steering wheel. In some implementations, the first electronic device 100 may determine whether the moving direction of the steering wheel is identical with the moving direction of the first electronic device 100. In some implementations, when the direction of the steering wheel is identical with the moving direction of the first electronic device 100 designated times or more within a designated time, the first electronic device 100 may determine that the user of the first electronic device 100 is driving.

In some implementations, the first electronic device 100 may determine an angle formed by the movement of the first electronic device 100. In some implementations, the first electronic device 100 may determine whether the angle formed by the movement of the first electronic device 100 is identical with a change amount of the steering angle. In some implementations, when the angle formed by the movement of the first electronic device 100 is identical with a change amount of the steering angle designated times or more within a designated time, the electronic device 100 may determine that the user of the electronic device 100 is driving.

In some implementations, the first electronic device 100 may determine a radius formed by the movement of the first electronic device 100. In some implementations, the first electronic device 100 may determine whether the radius formed by the movement of the first electronic device 100 is identical with a length from a center of the steering wheel stored in the memory 140 to the first electronic device 100. In some implementations, if the radius formed by the movement of the first electronic device 100 is identical with the length from a center of the steering wheel stored in the memory 140 to the first electronic device 100, the electronic device 100 may determine that the user of the electronic device 100 is driving.

In some implementations, if at least one (e.g., two) of the above determination condition is satisfied, the first electronic device 100 may determine that the user of the first electronic device 100 is driving.

In some implementations, if the above determination conditions are satisfied designated times or more within a designated time, the first electronic device 100 may determine that the user of the first electronic device 100 is driving.

In some implementations, when the speed of the vehicle is equal to or greater than designated speed (e.g., 10 km/h), the first electronic device 100 may determine whether the user is driving.

In some implementations, the first electronic device 100 may receive a beacon signal from the third electronic device 300, and determine whether the user of the first electronic device 100 is driving by using the received beacon signal. For example, if the designated beacon signal is received from the third electronic device 300, the first electronic device 100 may determine that the user of the first electronic device 100 is driving.

In some implementations, the first electronic device 100 may learn a determination result on whether the user of the first electronic device 100 is driving. For example, the first electronic device 100 may learn a movement pattern of the first electronic device 100 when the user of the first electronic device 100 is driving and a movement pattern of the first electronic device 100 when the user of the first electronic device 100 is not driving by using a learning algorithm. In some implementations, when the steering angle is not received from the third electronic device 300, the first electronic device 100 may determine whether the user of the first electronic device 100 is driving by using only the movement of the first electronic device 100 based on the learning result.

At operation 540, the first electronic device 100 may transmit the determination result on whether the user of the first electronic device 100 is driving to the third electronic device 300.

Figure 6:
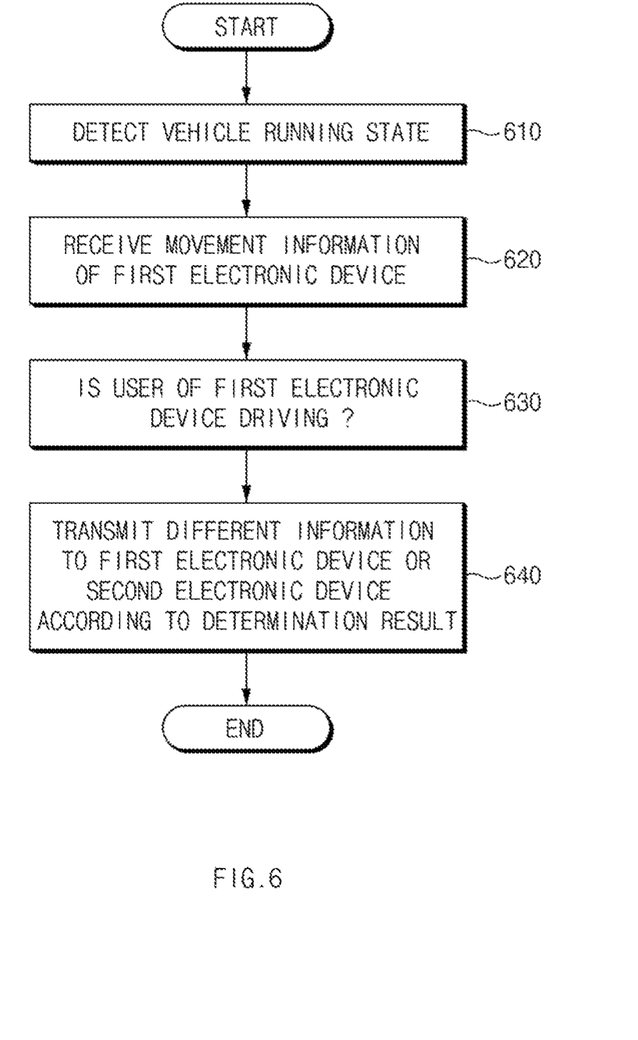
FIG. 6 is a flowchart illustrating a driver determination method of a third electronic device.

FIG. 6 is a flowchart illustrating a driver determination method of a third electronic device. In FIG. 6, at operation 610, the third electronic device 300 may detect a vehicle running state. For example, the third electronic device 300 may detect a steering angle of the steering wheel or a speed of the vehicle. According to an embodiment, the third electronic device 300 may detect the vehicle running state to generate vehicle running information.

At operation 620, the third electronic device 300 may receive the movement information of the first electronic device 100.

At operation 630, the first electronic 100 may determine whether the user of the first electronic device 100 is driving by using the movement of the first electronic device 100 and the vehicle running information.

In some implementations, the third electronic device 300 may determine a moving direction of the steering wheel by using the steering angle of the steering wheel. In some implementations, the third electronic device 300 may determine whether the moving direction of the steering wheel is identical with the moving direction of the first electronic device 100. In some implementations, when the moving direction of the steering wheel is identical with the moving direction of the first electronic device 100 designated times or more within a designated time, the third electronic device 300 may determine that the user of the first electronic device 100 is driving.

In some implementations, the third electronic device 300 may determine an angle formed by the movement of the first electronic device 100. In some implementations, the third electronic device 300 may determine whether the angle formed by the movement of the first electronic device 100 is identical with a change amount of the steering angle. In some implementations, when the angle formed by the movement of the first electronic device 100 is identical with the change amount of the steering angle designated times or more within a designated time, the third electronic device 300 may determine that the user of the electronic device 100 is driving.

In some implementations, the third electronic device 300 may determine a radius formed by the movement of the first electronic device 100. In some implementations, the third electronic device 300 may determine whether the radius formed by the movement of the first electronic device 100 is identical with a length, stored in the memory 140, from a center of the steering wheel to the first electronic device 100. In some implementations, if the radius formed by the movement of the first electronic device 100 is identical with the length, stored in the memory 140, from a center of the steering wheel to the first electronic device 100, the third electronic device 300 may determine that the user of the electronic device 100 is driving.

In some implementations, if at least one (e.g., two) of the above determination condition is satisfied, the third electronic device 300 may determine that the user of the first electronic device 100 is driving.

In some implementations, if the above determination conditions are satisfied designated times or more within a designated time, the third electronic device 300 may determine that the user of the first electronic device 100 is driving.

In some implementations, when the speed of the vehicle is equal to or greater than designated speed (e.g., 10 km/h), the third electronic device 300 may determine whether the user is driving.

In some implementations, the third electronic device 300 may receive a beacon signal from the first electronic device 100, and determine whether the user of the first electronic device 100 is driving by using the received beacon signal. For example, if the designated beacon signal is received from the first electronic device 100, the third electronic device 300 may determine that the user of the first electronic device 100 is driving.

In some implementations, the third electronic device 300 may learn a determination result on whether the user of the first electronic device 100 is driving. For example, the first electronic device 100 may learn a movement pattern of the first electronic device 100 when it is determined that the user of the first electronic device 100 is driving and a movement pattern of the first electronic device 100 when it is determined that the user of the first electronic device 100 is not driving by using a learning algorithm.

At operation 640, the third electronic device 300 may transmit different information to the first electronic device 100 or the second electronic device 200 depending on a determination result on whether the user of the first electronic device 100 is driving.

For example, if the user of the first electronic device 100 is driving, the third electronic device 300 may transmit information on running of the vehicle such as a speed limit, a traffic signal violation alarm signal, traffic information, and a remaining distance to a destination to the first electronic device 100 or the second electronic device 200. For another example, if the user of the first electronic device 100 is not driving (e.g., passenger), the third electronic device 300 may provide contents such as moving images, images, music, and the like to the first electronic device 100 or the second electronic device 200.

The term "module" used in this specification may mean, for example, a unit including one or a combination of at least two of hardware, software, or firmware. The "module" may be interchangeably used with terms such as a unit, a logic, a logical block, a component, or a circuit. The "module" may be a minimum unit or a part of integrally configured component. The "module" may be a minimum unit or a part for performing one or more functions. The "module" may be mechanically or electronically implemented. For example, the "module" may include at least one of an application-specific integrated circuit (ASIC) chip, field-programmable gate arrays (FPGAs) or a programmable-logic device for performing certain operations which are known or will be developed.

For example, at least a part of an apparatus (e.g., modules or functions thereof) and a method (e.g., operations) according various forms may be implemented by a command stored in computer-readable storage media in the form of a program module. When the command is executed by a processor (e.g., control module 140), the at least one processor may perform a function corresponding to the command. The computer-readable storage media may be, for example, the memory 130.

The computer readable recording medium may include hard disk, floppy disk, magnetic media (e.g., magnetic tape), optical media (e.g., compact disc read only memory (CD-ROM)), digital versatile disc (DVD), magneto-optical media (e.g., floptical disk), a hardware device (e.g., read only memory (ROM), random access memory (RAM), or a flash memory). Further, the program command may include a high-level language code executable by a computer using an interpreter as well as a machine language code created by a compiler. The aforementioned hardware device may be configured to be operated according to at least one software module to perform an operation of the present invention, and vice versa.

A module or a program module according to various forms may include at least one of the above constituent elements, omit some elements, or may further include additional other constituent elements. The operations performed by the module, the program module or other constituent elements according to various forms may be executed in a sequential, parallel, iterative, or heuristic method. Further, some operations may be executed in a different order, omitted, or other operations may be added.

Further, forms and implementations of the disclosure that are disclosed in this specification are illustrative for the purpose of description and understanding of technical contents, and do not limit the scope of a technology disclosed in this specification. Accordingly, it should be clearly understood that many variations and modifications of the basic inventive concepts herein taught which may appear to those skilled in the present art will still fall within the spirit and scope of the present invention, as defined in the appended claims

What is claimed is:

1. An electronic device comprising:
    a sensor module including at least one of an accelerometer or a gyro sensor, wherein the sensor module is configured to detect movement of the electronic device by measuring an acceleration by the accelerometer or an angular velocity measured by the gyro sensor;
    a communication module configured to receive a steering angle of a steering wheel from a steering angle sensor, wherein the steering angle sensor is configured to detect the steering angle based on a measurement of rotation of the steering wheel; and a control module configured to:
- determine an angle formed by the detected movement of the electronic device;
- determine that a user of the electronic device is driving when the angle formed by the movement of the electronic device is identical with a change amount of the steering angle a designated number of times;
- control to receive a driving information of a vehicle from the external electronic device when the user of electronic device is driving; and
- control to receive media contents from the external electronic device when the user of electronic device is not driving.

2. The electronic device of claim 1, wherein the control module is configured to determine a moving direction of the steering wheel based on the steering angle of the steering wheel, and to determine that the user of the electronic device is driving when the moving direction of the steering wheel is identical with the moving direction of the electronic device a designated number of times.

3. The electronic device of claim 1, further comprising a memory configured to store a length from a center of the steering wheel to the electronic device while the user grips the steering wheel,
wherein the control module is configured to determine a radius formed by the movement of the electronic device, and to determine that the user of the electronic device is driving when the radius is identical with the length stored in the memory a designated number of times.

4. The electronic device of claim 1, wherein the control module is configured to transmit a determination result to the external device based on whether the user of the electronic device is driving.

5. The electronic device of claim 1, wherein the control module is configured to reach a determination result based on whether the user of the electronic device is driving, and to determine whether the user of the electronic device is driving based on the learning result when the steering angle is not received from the external electronic device.

6. An electronic device comprising:
- a steering angle sensor configured to measure a steering angle of a steering wheel based on a measured rotation of the steering wheel;
- a communication module configured to receive movement information of the electronic device from an external electronic device, wherein the movement information is based on at least one of an acceleration measured by the external electronic device or an angular velocity measured by the external electronic device; and
- a control module configured to:
  - transmit a driving information of a vehicle when a user of the external electronic device is driving;
  - transmit media contents when the user of the external electronic device is not driving;
  - determine an angle formed by the movement of the external electronic device; and
  - determine that the user of the external electronic device is driving when the angle formed by the movement of the electronic device is identical with a change amount of the steering angle a designated number of times.

7. The electronic device of claim 6, wherein the control module is configured to determine a moving direction of the steering wheel based on the steering angle of the steering wheel, and to determine that the user of the external electronic device is driving when the moving direction of the steering wheel is identical with the moving direction of the external electronic device a designated number of times.

8. The electronic device of claim 6, further comprising a memory configured to store a length from a center of the steering wheel to the electronic device while the user grips the steering wheel,
wherein the control module is configured to determine a radius formed by the movement of the electronic device, and to determine that the user of the electronic device is driving when the radius is identical with the length stored in the memory a designated number of times.

9. A driver determination method of an electronic device, the method comprising:
- detecting movement of the electronic device based on at least one of an acceleration measured by the electronic device or an angular velocity measured by the electronic device;
- receiving a steering angle of a steering wheel from an external electronic device based on a measured rotation of the steering wheel;
- determining whether a user of the electronic device is driving based on the movement of the electronic device and the received steering angle of the steering wheel by:
  - determining an angle formed by the movement of the electronic device;
  - determining that a user of the electronic device is driving when the angle formed by the movement of the electronic device is identical with a change amount of the steering angle a designated number of times;
- receiving a driving information of a vehicle from the external electronic device when the user of electronic device is driving; and
- receiving media contents from the external electronic device when the user of electronic device is not driving.

10. The driver determination method of claim 9, wherein determining whether a user of the electronic device is driving comprises determining a moving direction of the steering wheel based on the steering angle of the steering wheel; and
determining that the user of the electronic device is driving when the moving direction of the steering wheel is identical with the moving direction of the electronic device a designated number times.

11. The driver determination method of claim 9, wherein determining whether a user of the electronic device is driving comprises:
- determining a radius formed by the movement of the electronic device; and
- determining that the user of the electronic device is driving, when the radius formed by the movement of the electronic device is identical with a length, which is previously stored in a memory, from a center of the steering wheel to the electronic device a designated number of times while the user grips the steering wheel.

12. The driver determination method of claim 9, further comprising transmitting a determination result based on whether the user of the electronic device is driving to the external electronic device.

13. The driver determination method of claim 9, further comprising:
- learning a determination result based on whether the user of the first electronic device is driving; and determining whether the user of the electronic device is driving based on the learning result when vehicle running information is not received.

14. A driver determination method of an electronic device, the method comprising:
  measuring a steering angle of a steering wheel based on a measured rotation of the steering wheel;
  receiving movement information of the electronic device from an external electronic device, wherein the movement information is based on at least one of an acceleration measured by the external electronic device or an angular velocity measured by the external electronic device;
  determining whether a user of the external electronic device is driving based on the movement information of the external electronic device and the steering angle of the steering wheel by:
    determining an angle formed by the movement of the electronic device;
  determining that the user of the electronic device is driving when the angle formed by the movement of the electronic device is identical with a change amount of the steering angle a designated number of times;
  transmitting a driving information of a vehicle when the user of the electronic device is driving; and
  transmitting media contents when the user of electronic device is not driving.

* * * * *